United States Patent Office.

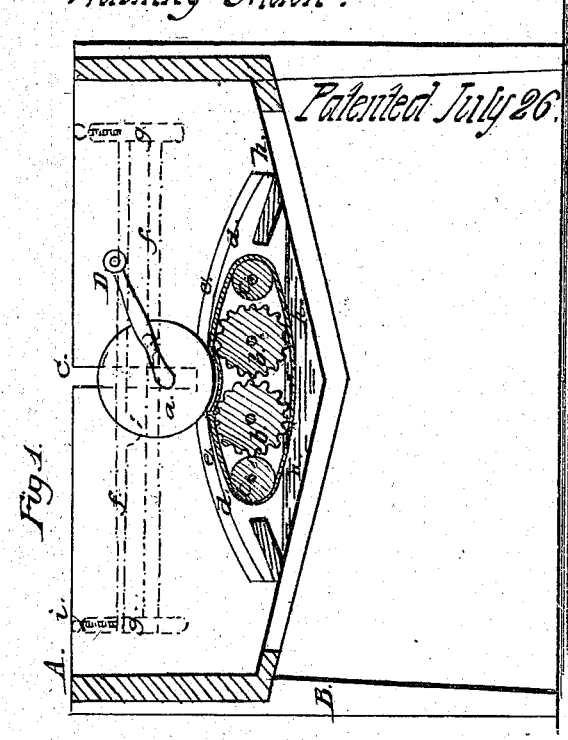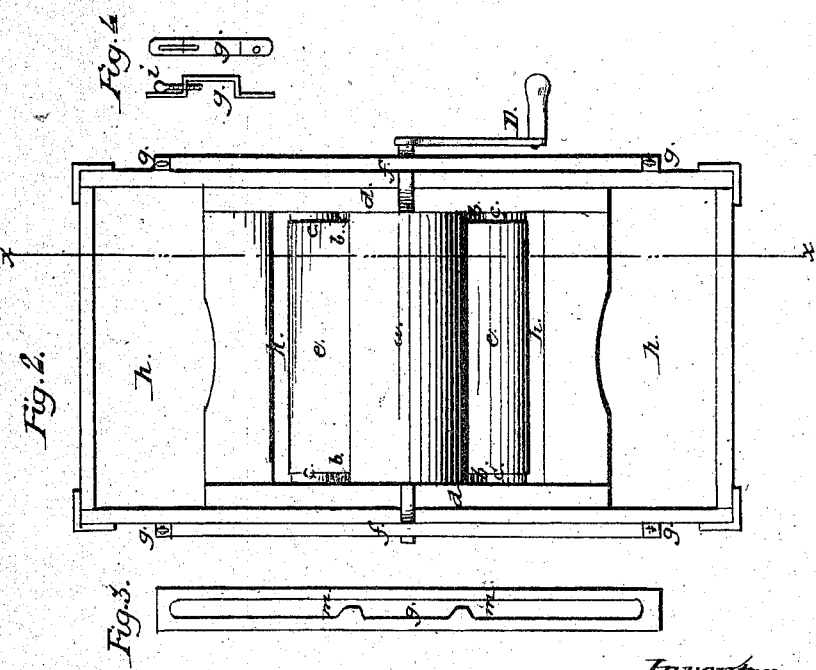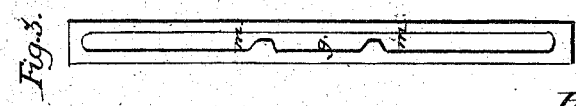

WILLIAM B. CHEESEMAN, OF WINONA, MINNESOTA.

Letters Patent No. 105,646, dated July 26, 1870.

IMPROVED WASHING-MACHINE.

The Schedule referred to in these Letters Patent and making part of the same.

*To all whom it may concern:*

Be it known that I, WILLIAM B. CHEESEMAN, of Winona, in the county of Winona and State of Minnesota, have invented certain new and useful Improvements in Washing-Machines; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

My invention relates to washing-machines, and consists in a novel construction and arrangement of its parts, so that they may operate in an effective and peculiar manner, and so that the operating or mechanical devices may be inserted or removed at pleasure.

In the drawing—

Figure 1 is a longitudinal vertical section on the line $x$ $x$ of fig. 2;

Figure 2 is a top plan view; and

Figures 3 and 4 are views of parts detached.

In constructing my machine, I make a box or body, A, out of wood, or any suitable material, with its bottom shaped so as to form an obtuse angle in the center, as shown in fig. 1.

This box I mount on legs B, as shown in the same figure, and cover its bottom with zinc $h$, so that all dirt may be easily removed, and the interior kept perfectly clean.

Within the box A I place a shoe, $d$, provided with two smooth rollers, $c$, having an endless apron, $e$, passing around them, and with two grooved rollers, $b$, arranged as shown in figs. 1 and 2.

This shoe $d$ is made of two side pieces, shaped as shown in fig. 1, and of two end pieces, as shown in fig. 2, and is made of the proper size for being easily inserted or removed from the box A.

In the sides of the box A, I cut vertical slots C, so as to be directly opposite each other, and directly over the rollers $b$, when in the box, and in them I mount the large roller A, as clearly shown in figs. 1 and 2, with one of its journals projecting beyond the side of the box, and having connected thereto a crank, D, for turning it, as shown in the same figures.

This large roller $a$ may be grooved or not, as desired.

To the sides of the box A, I fasten rests or supports $g$, as shown in fig. 2, and in dotted lines in fig. 1, and shaped as clearly shown in fig. 4, so that, when attached to the sides of the box, there will be an oblong rectangular opening, in which I insert wooden springs $f$, so as to be directly over the journals of the roller A, as clearly shown in fig. 2.

These springs are provided with projections $m$ $m$, for limiting the tension of the same, as clearly shown in fig. 3.

In the upper side of the rests $g$, I place set-screws $i$, for the purpose of holding the springs $f$ in place or adjusting them, and, when desired, for releasing them.

In operating my machine, I first place the shoe $d$, with its rollers $b$ $c$ and endless apron $e$, in position, and then, in like manner, the roller $a$.

This done, I insert the springs $f$ and lock them in place by the set-screws $g$; then pour in a sufficient quantity of the kind of water required, and the articles or fabrics to be washed, and operate the machine by means of the crank D.

The endless apron $e$ will carry the clothes or articles between the rollers $a$ and $b$, by which the dirt will be loosened and the articles washed.

As different thicknesses of the same articles, or different thicknesses made by two or more articles, pass between the rollers, the spring $f$ allows the upper one to adjust itself, to these varying or various thicknesses.

When the washing is over, by simply releasing the set-screws $i$, the springs $f$ may be removed, and the roller $a$ and the shoe $d$, with its rollers $b$ $c$ and endless apron $e$, be taken out, so that they can be dried, and the interior of the machine thoroughly cleaned.

I claim as my improvement—

The adjustable spring $f$, attached to the sides of the box A by the supports $g$ and set-screws $i$, constructed as described, in combination with the roller $a$ and removable frame $d$, provided with corrugated rollers $b$ $b$, smooth rollers $c$ $c$, and endless apron $e$, in the manner and for the purpose specified.

WILLIAM B. CHEESEMAN.

Witnesses:
THOMAS SIMPSON,
GEO. P. WILSON.